United States Patent
Masanek, Jr. et al.

(10) Patent No.: US 9,610,880 B2
(45) Date of Patent: Apr. 4, 2017

(54) MULTI-VEHICLE RETENTION GROMMET

(71) Applicant: MacNeil IP LLC, Bolingbrook, IL (US)

(72) Inventors: Frederick W. Masanek, Jr., Barrington, IL (US); Allan R. Thom, Burr Ridge, IL (US); Judd C. Kaufman, Naperville, IL (US); David S. Iverson, Hinsdale, IL (US)

(73) Assignee: MACNEIL IP LLC, Bolingbrook, IL (US)

( * ) Notice: Subject to any disclaimer, the term of this patent is extended or adjusted under 35 U.S.C. 154(b) by 0 days.

(21) Appl. No.: 14/874,193

(22) Filed: Oct. 2, 2015

(65) Prior Publication Data

US 2017/0028895 A1 Feb. 2, 2017

Related U.S. Application Data

(63) Continuation-in-part of application No. 14/812,663, filed on Jul. 29, 2015.

(51) Int. Cl.
*A47G 27/04* (2006.01)
*B60N 3/04* (2006.01)

(52) U.S. Cl.
CPC ............. *B60N 3/046* (2013.01); *B60N 3/044* (2013.01)

(58) Field of Classification Search
CPC .. A47G 27/04; A47G 27/045; A47G 27/0493; A47G 27/0412; A47G 27/0418;
(Continued)

(56) References Cited

U.S. PATENT DOCUMENTS 1,416,051 A 5/1922 Muller
1,425,006 A 8/1922 Goldstein
(Continued)

FOREIGN PATENT DOCUMENTS

DE 3142761 A1 9/1982
DE 3240270 A1 5/1984
(Continued)

OTHER PUBLICATIONS

Ebay Vintage Plastic Furniture Coasters Floor Rug Protectors LOT, downloaded from http://www.ebay.com/itm/like/400835847592?lpid=82&chn=ps on Jan. 26, 2015.
(Continued)

*Primary Examiner* — Chuck Mah
(74) *Attorney, Agent, or Firm* — Perkins IP Law Group LLC; Jefferson Perkins

(57) ABSTRACT

A retention grommet has a bottom grommet and a top grommet. A floor cover retention flange extends radially outwardly from an outer sidewall of the bottom grommet. The outer sidewall extends upwardly from the retention flange to a hinge plane of the bottom grommet. Plural fingers are disposed around the bottom grommet axis so as to be angularly spaced from each other and an inner surface of the outer sidewall. An upper end of each finger is joined to the outer sidewall at the hinge plane. Near a free, downwardly displaced end of each finger, a retention bead is formed to have an upwardly and radially outwardly inclined surface. This surface engages a retention post of any of several vehicle foot well affixation devices, one of which is adapted to be affixed to a carpeted surface and another of which is adapted to be affixed to a smooth surface.

7 Claims, 11 Drawing Sheets

(58) Field of Classification Search
CPC .... A47G 27/0431; B60N 3/046; B60N 3/044; B60R 13/0206; Y10T 16/118; Y10T 16/10; Y10T 16/05; Y10T 428/24017
See application file for complete search history.

(56) References Cited

U.S. PATENT DOCUMENTS

| | | | |
|---|---|---|---|
| 1,559,827 | A | 11/1925 | Wittman |
| 1,840,272 | A | 1/1932 | Fenton et al. |
| 2,301,385 | A | 11/1942 | Ehrgott |
| 2,729,019 | A | 1/1956 | Breeden |
| 4,086,679 | A | 5/1978 | Butler |
| 4,392,279 | A | 7/1983 | Schwager |
| 4,561,146 | A | 12/1985 | Schaty |
| 4,562,624 | A | 1/1986 | Kanzaka |
| 4,761,860 | A | 8/1988 | Krauss |
| 4,829,627 | A | 5/1989 | Altus et al. |
| 4,833,760 | A | 5/1989 | Sundstrom |
| 4,878,792 | A | 11/1989 | Frano |
| 4,998,319 | A | 3/1991 | Ford |
| 5,034,258 | A * | 7/1991 | Grace ............... A47G 27/0412 156/290 |
| 5,148,581 | A | 9/1992 | Hartmann |
| 5,170,985 | A | 12/1992 | Killworth et al. |
| 5,195,857 | A | 3/1993 | Hiramoto |
| 5,308,671 | A | 5/1994 | Wells |
| 5,362,187 | A | 11/1994 | Scalise |
| 5,400,461 | A | 3/1995 | Malish et al. |
| 5,511,919 | A | 4/1996 | Scalise |
| 5,566,430 | A | 10/1996 | Cheng |
| 5,647,107 | A | 7/1997 | Brewster |
| 5,743,506 | A | 4/1998 | Adams |
| 5,775,859 | A | 7/1998 | Anscher |
| 5,950,277 | A | 9/1999 | Tallmadge et al. |
| 6,119,998 | A | 9/2000 | Anselmo |
| D432,904 | S | 10/2000 | Anselmo |
| 6,345,946 | B1 | 2/2002 | Mainini et al. |
| 6,357,090 | B1 | 3/2002 | Murai |
| 6,381,806 | B1 | 5/2002 | Stanesic et al. |
| 6,431,585 | B1 | 8/2002 | Rickabus et al. |
| 6,435,790 | B1 | 8/2002 | Ichikawa |
| 6,497,003 | B2 | 12/2002 | Calabrese |
| 6,568,893 | B2 | 5/2003 | LeVey et al. |
| 6,757,945 | B2 | 7/2004 | Shibuya et al. |
| 6,840,488 | B2 | 1/2005 | Ngo et al. |
| 7,546,661 | B2 | 6/2009 | Connor, Jr. |
| 8,375,514 | B2 | 2/2013 | Dendo |
| D679,170 | S | 4/2013 | Else |
| 8,495,791 | B2 | 7/2013 | Yoon |
| 8,757,698 | B1 | 6/2014 | Rowland |
| 2001/0004784 | A1 * | 6/2001 | Calabrese ............ B60N 3/046 16/8 |
| 2002/0078537 | A1 * | 6/2002 | Shibuya ............ A47G 27/0418 24/662 |
| 2004/0181899 | A1 | 9/2004 | Horst |
| 2004/0181900 | A1 * | 9/2004 | Horst ................ A47G 27/0418 16/4 |
| 2009/0151135 | A1 * | 6/2009 | Park ..................... B60N 3/046 24/453 |
| 2009/0155015 | A1 * | 6/2009 | Parisi ................... B60N 3/046 411/172 |
| 2009/0235485 | A1 | 9/2009 | Connor, Jr. |
| 2010/0122429 | A1 | 5/2010 | Gonzalez et al. |
| 2010/0287748 | A1 * | 11/2010 | Courtin ................ B60N 3/046 24/700 |
| 2013/0287996 | A1 | 10/2013 | Masanek, Jr. et al. |
| 2014/0113110 | A1 | 4/2014 | Johnson et al. |
| 2014/0138509 | A1 | 5/2014 | Lehman |
| 2014/0373314 | A1 * | 12/2014 | Machida ............... B60N 3/046 24/351 |

FOREIGN PATENT DOCUMENTS

| | | | | |
|---|---|---|---|---|
| DE | G9115861.3 | U1 | 4/1992 | |
| DE | G9300657.8 | U1 | 4/1993 | |
| DE | 19805949 | A1 | 8/1999 | |
| DE | 20001405 | U1 | 5/2000 | |
| DE | 20021880 | U1 * | 3/2001 | ............ B60N 3/046 |
| DE | 10059322 | A1 | 7/2001 | |
| DE | 19617408 | C2 | 2/2003 | |
| DE | 19655255 | B4 | 4/2013 | |
| DE | 102013004402 | A1 * | 9/2014 | ............ B60N 3/046 |
| EP | 0188639 | A1 | 7/1986 | |
| EP | 0311736 | A1 | 4/1989 | |
| EP | 1232070 | B1 | 1/2005 | |
| EP | 1980444 | A2 | 10/2008 | |
| FR | 1405310 | A | 7/1965 | |
| FR | 92613 | A | 12/1968 | |
| FR | 2970446 | A1 | 7/2012 | |
| GB | 1236407 | A | 6/1971 | |
| GB | 2087229 | A | 5/1982 | |
| JP | 2010180929 | A | 8/2010 | |
| JP | 2011195071 | A | 10/2011 | |
| WO | 9745291 | A1 | 12/1997 | |
| WO | 2011033482 | A1 | 3/2011 | |
| WO | 2012039058 | A1 | 3/2012 | |

OTHER PUBLICATIONS

US Patent and Trademark Office Acting as International Searching Authority, International Search Report and Written Opinion of the International Searching Authority issued on International Application No. PCT/US2013/038361 on Oct. 10, 2013.

European Patent Office, Extended European Search Report issued on European Patent Application No. 14162357.9.-1758 on Jun. 6, 2014.

US Patent and Trademark Office Acting as International Searching Authority, International Search Report and Written Opinion of the International Searching Authority issued on International Application No. PCT/US14/41898 on Sep. 23, 2014.

* cited by examiner

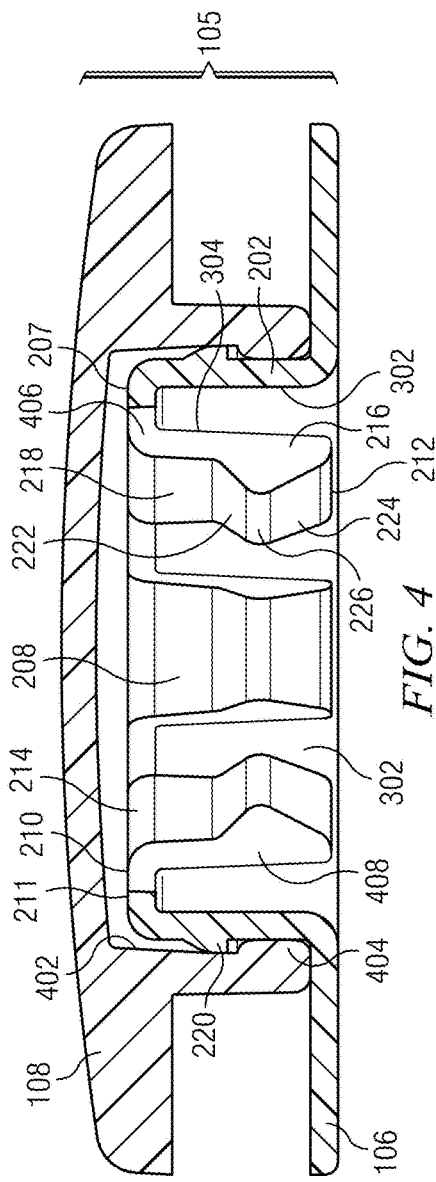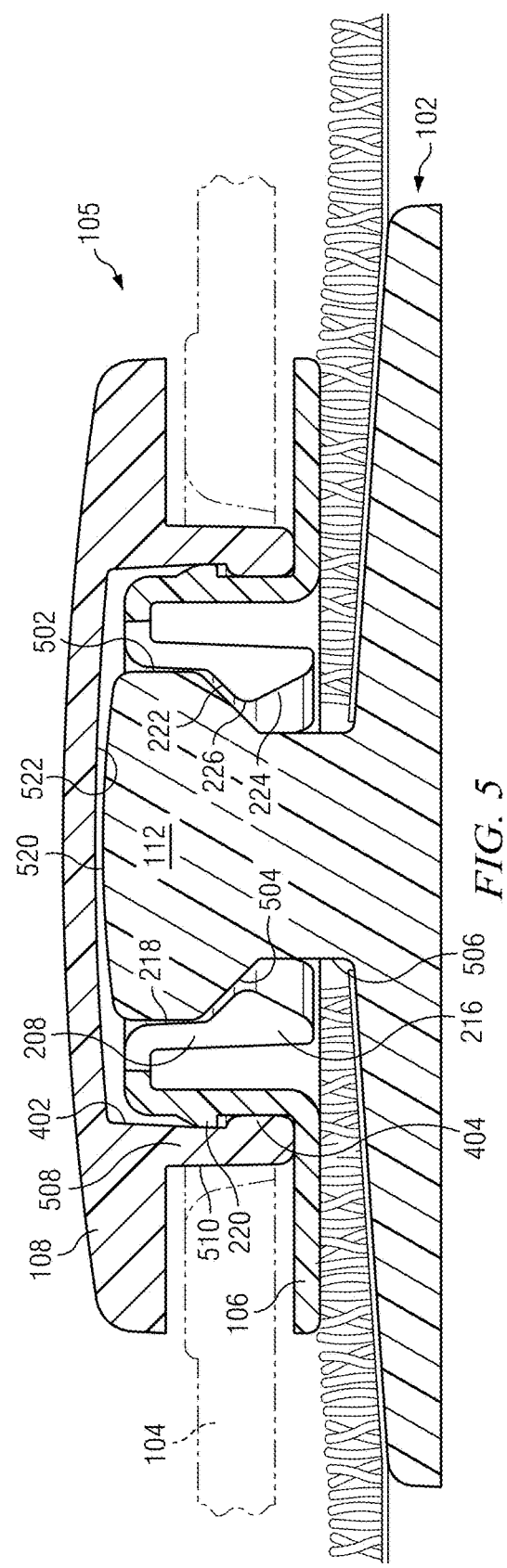

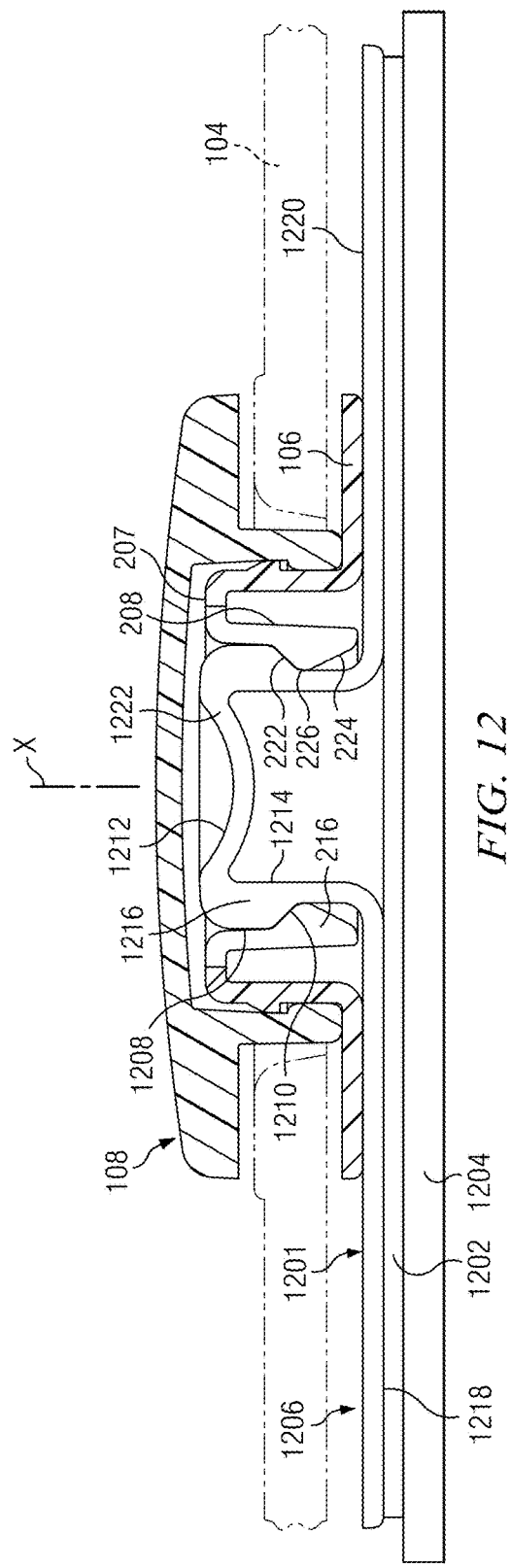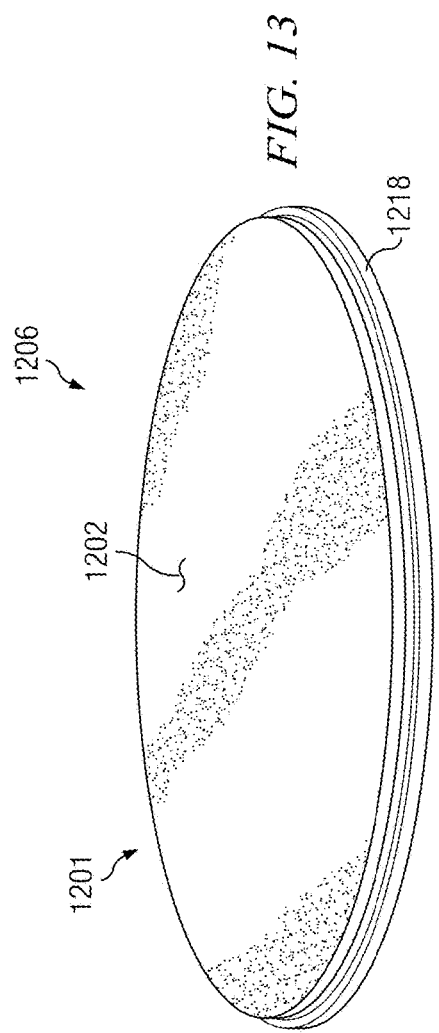

MULTI-VEHICLE RETENTION GROMMET

RELATED APPLICATIONS

This application is a continuation in part of copending U.S. patent application Ser. No. 14/812,663 filed Jul. 29, 2015, assigned to the assignee hereof. The specification and drawings of said application are fully incorporated by reference herein.

BACKGROUND OF THE INVENTION

Vehicle floor covers, such as floor mats and floor trays, are commonly available to protect the underlying vehicle carpeting and to facilitate removal of water, dirt and debris from the foot wells of the vehicle. Due to the danger of interference with the gas and brake pedals, it is recommended that at least the floor cover provided for the driver's side be secured in place within the foot well. Many vehicle manufacturers secure their floor covers by employing retention posts, which are affixed to the foot well, in combination with holes in the floor covers. Many of these studs or posts have a shaft of limited diameter that terminates in an enlarged head.

Retention post sizes vary among makes and models of vehicles. In addition, a hole in a floor cover doesn't always provide the secure fit desired for a floor cover. A grommet may be used to engage the retention post and floor cover in a tighter, more secure manner. A grommet that fits many retention posts would be able to be used in multiple makes and models of vehicles.

SUMMARY OF THE INVENTION

According to one aspect of the invention, a system for attaching a floor cover to a vehicle foot well includes a bottom grommet and a top grommet. The bottom grommet is formed around an axis and has a floor cover retention flange that radially outwardly extends from the outer surface of an upstanding outer sidewall. The outer sidewall upwardly extends to a hinge plane, which may be collocated with the top of the outer sidewall. The top or hinge plane of the bottom grommet may have an annulus that extends radially inwardly from the outer sidewall to an inner end of the hinge plane. Several fingers have respective upper ends that join to the inner end of the annulus and extend downwardly to respective finger lower ends. Each finger has a bead near its lower end that radially inwardly extends from a more general inner sidewall surface of the finger. In combination with the other fingers, this bead is adapted to engage a vehicle foot well retention post head of any of several types with an interference fit. A top grommet is provided that fastens to an outer surface of the outer sidewall of the bottom grommet. The system further includes an affixation device that is adapted for attachment to a vehicle foot well. An upstanding retention post of the affixation device is adapted to engage the fingers of the bottom grommet. A lower surface of the affixation device may include a plurality of downwardly extending projections for engaging a carpeted foot well surface, or may have an adhesive layer that is adapted to be affixed to an uncarpeted surface of the vehicle foot well.

According to another aspect of the invention, a system for attaching a vehicle floor cover to a vehicle foot well has a bottom grommet and a top grommet. The bottom grommet has an outer sidewall formed around an axis. A floor cover retention flange radially outwardly extends from the outer surface of the outer sidewall. The outer sidewall extends axially upwardly from the retention flange to a top plane of the bottom grommet. The outer sidewall has an inner surface. Plural fingers, integrally formed with the outer sidewall, are radially inwardly spaced from the inner surface of the outer sidewall, and are angularly spaced apart from each other. Each finger has a lower end axially and downwardly spaced from the top plane of the outer sidewall. Each finger has a bead disposed near its lower end. Each bead has an innermost margin and an inclined surface which extends upwardly and outwardly from the innermost margin of the bead to a general inner sidewall surface of the finger. This inclined surface is adapted to engage, with an interference fit, the enlarged heads of each of several types of retention posts. A top grommet is adapted to fasten to the outer surface of the outer sidewall of the bottom grommet. The system further includes an affixation device for attachment to the vehicle foot well. A retention post stands up from the affixation device body and is adapted to engage the fingers of the bottom grommet. The affixation device may have a plurality of projections that extend downward from a lower surface of its body to engage a carpeted surface of the vehicle foot well, or may have an adhesive layer that is adapted to be affixed to a smooth surface of the vehicle foot well.

In either of the above embodiments, the bottom grommet may be further provided with a plurality of spaced-apart vertical ribs. These ribs are angularly spaced around and are in alignment with the axis; each vertical rib is disposed between neighboring fingers. The fingers have inner sidewall surfaces that conform to an imaginary cylinder, a diameter of which is preselected to be larger than the largest type of post head that the grommet is designed to accommodate. The vertical ribs each extend, radially inwardly, from the inner surface of the bottom grommet outer sidewall to the imaginary cylinder. These ribs resist lateral movement of the grommet relative to the retention post once the grommet has been snapped over the post.

Alternatively or in addition, each finger of the bottom grommet may be provided with a reinforcing rib that is aligned with the axis and that extends from an inner surface of the outer sidewall of the bottom grommet to an outer surface of the finger. An angular extent of the reinforcing rib, relative to the axis, is much smaller than an angular extent of the finger for which it is provided to brace, such as being one-fourth or less of the angular extent of the finger proper.

A principal technical advantage of one embodiment of the invention is that the inclined plane of each finger bead provides an extensive surface, different points of which can engage different enlarged post head structures with an interference fit. This in turn permits the use of the grommet with floor covers for many makes and models of vehicles. The provision of a single grommet for multiple vehicle types reduces the overall manufacturing, tooling, research and development costs for the vehicle floor mats and trays fitted with the grommets.

BRIEF DESCRIPTION OF THE DRAWINGS

Further aspects of the invention and their advantages can be discerned in the following detailed description, in which like characters denote like parts and in which:

FIG. 4 is a side sectional view, on a plane including a grommet axis, of the bottom grommet and top grommet as assembled;

FIG. 5 is a sectional view, on a plane including the grommet axis, of the embodiment shown in FIGS. 1-4, shown as fastening a vehicle floor cover to a first vehicle floor cover retention post;

FIG. 12 is a vertical sectional view, taken through axis X, of a further embodiment of the invention shown as assembled to a floor cover and engaging a smooth surface in a vehicle foot well;

FIG. 13 is a bottom isometric view of a further embodiment of an affixation device;

DETAILED DESCRIPTION

Figure 1:
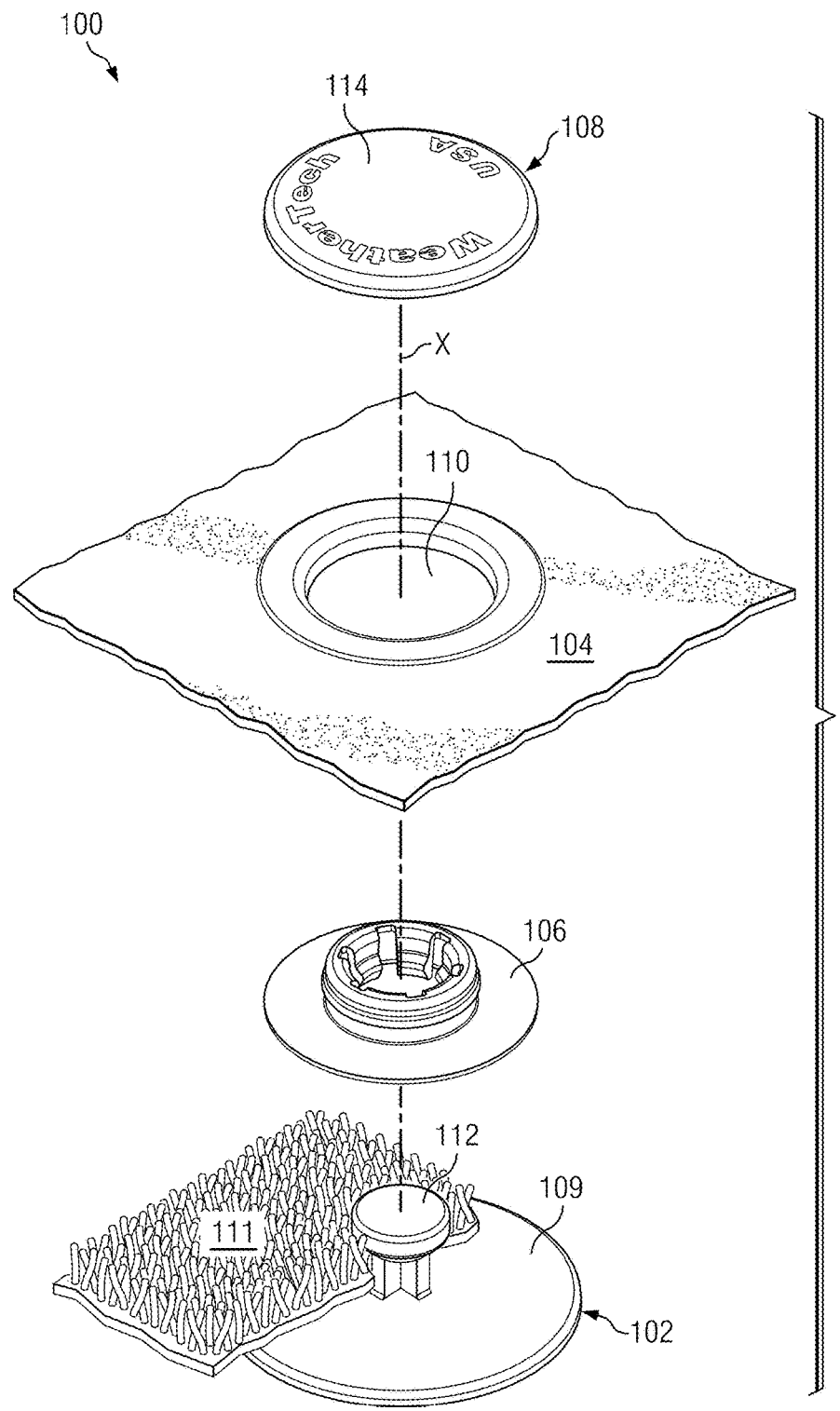
FIG. 1 is an isometric exploded view showing a portion of a vehicle floor cover, a bottom grommet, a vehicle foot well retention stud and a retention grommet cap (or top grommet)

As described above, the present invention provides a grommet that engages any of several vehicle foot well retention posts or studs. As seen in FIG. 1, grommets according to the invention have two components: a retention or bottom grommet 106 and a top grommet or cap 108. A retention or bottom grommet 106 is axially aligned with a vehicle foot well retention post or stud 102, a portion of a vehicle floor cover 104, and a top grommet or cap 108. The vehicle floor cover retention stud 102 protrudes through the original equipment manufacturer (OEM) vehicle carpet 111 and is formed around an axis X. Axis X typically is vertical but, in some vehicle foot wells, may be canted away from the vertical. Stud or post 102 may have an extensive base 109 that in use is disposed underneath the OEM carpet layer 111.

The function of the vehicle floor cover 104 is to protect this OEM carpet or surface 111, and provide an easy way for the vehicle owner to keep the vehicle foot well clean; the owner (or other user, or attendant) removes the vehicle floor cover, washes it off, and replaces it in the foot well. The vehicle floor cover 104, which can be a floor mat or a floor tray, has a floor cover retention hole 110 into which the bottom grommet 106 protrudes from below. Often there are two laterally spaced-apart studs or posts and floor cover retention holes 110, typically located near the aft outboard and aft inboard corners of the foot well and floor cover, but only a representative one of them is shown in FIGS. 1 and 5-5C.

The bottom grommet 106 may be integrally molded from a polymeric material, such as nylon or other suitable material. The bottom grommet 106 engages an enlarged head 112 of the vehicle floor cover retention stud or post 102. The vehicle floor cover retention stud 102 may have the shape of the stud illustrated in FIG. 1, or may be of a myriad of other shapes depending on the make and model of the vehicle; four such shapes are shown in FIGS. 5-5C, discussed below. In the illustrated embodiment, the bottom grommet 106 extends through the floor cover retention hole 110 and a top grommet or cap 108 is attached to the bottom grommet 106, as by being snapped over the bottom grommet's outer sidewall.

In the illustrated embodiments the top grommet 108 downwardly extends through most or all of the retention hole 110, as will be hereinafter described. The top grommet 108 may be integrally molded from a polymeric material, such as nylon, or other suitable material. In the illustrated embodiment the top grommet 108 has a solid top or cap 114 that completely covers floor cover hole 110 and bottom grommet 106. Alternative embodiments of the top grommet 108 may have an open top or partially open top.

Figure 2:
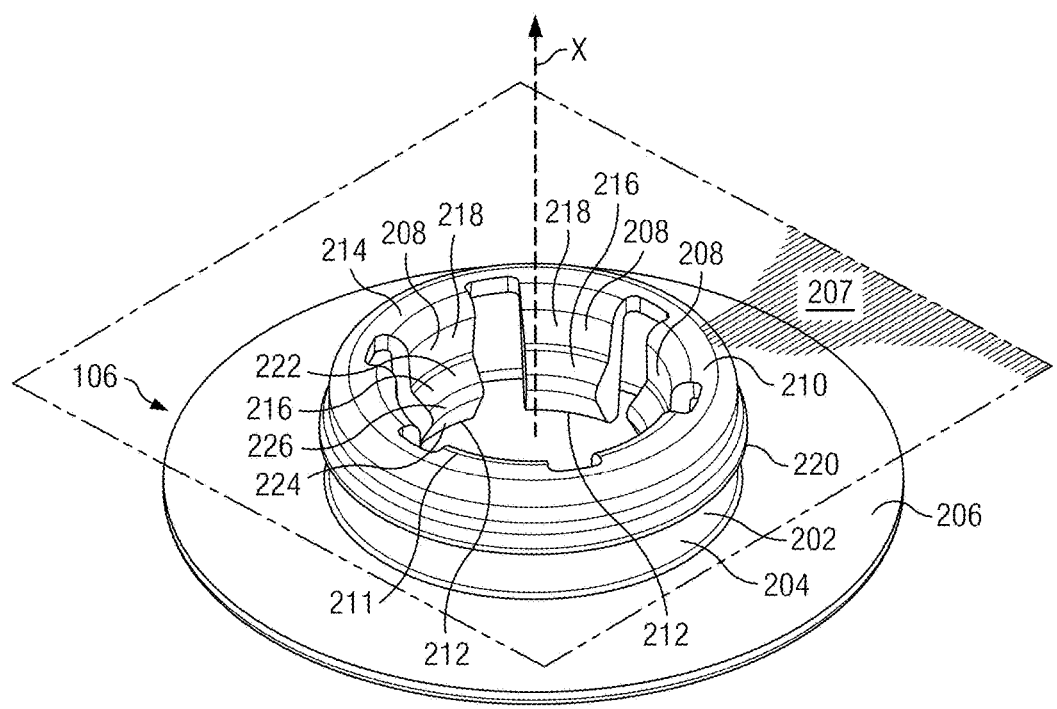
FIG. 2 is a top isometric view of the bottom grommet shown in FIG. 1.

As seen in FIG. 2, the bottom grommet 106 has an outer sidewall 202 with an outer surface 204. An annular engagement ridge 220, which can be orthogonal to axis X, extends radially outwardly from the outer surface 204 of the bottom grommet outer sidewall 202. A floor cover retention flange 206 radially outwardly extends from the outer surface 204 of the outer sidewall 202, and is downwardly spaced from the engagement ridge 220. The outer sidewall 202 extends upwardly from the retention flange 206 at least to a top or hinge plane 207 that is orthogonal to axis X. In the illustrated embodiments the bottom grommet outer sidewall 202 has its upper end at plane 207, but in other embodiments the outer sidewall 202 could continue upwardly beyond the hinge plane 207. In operation and in this embodiment, the outer sidewall 202 extends completely through the hole 110 in a vehicle floor cover 104, as shown in FIGS. 1 and 5-5C.

A radially inwardly extending annulus 210 is disposed in the hinge plane 207 and in the illustrated embodiment is formed to be at right angles to the axis X. The annulus 210 extends from the inner surface 302 (see FIG. 3) of the outer sidewall 202 to an annulus inner end 211. A plurality of angularly spaced-apart fingers 208 are disposed around axis X, and are joined to the inner end 211 of the annulus 210 by their respective upper ends 214. In this illustrated embodiment there are six fingers 208 but other embodiments may have more or fewer fingers 208 and the fingers 208 may differ in angular width (relative to axis X) from the width illustrated. Further, while in the illustrated embodiment the angular width of the fingers is uniform, this does not have to be the case, and some of the fingers 208 may have different angular widths than others.

Each finger 208 extends axially downwardly from its upper end 214 to a lower end 212. Each finger 208 has an inner sidewall surface 218 that is in approximate alignment with axis X and may conform to an imaginary right cylinder (not shown) around axis X. Each finger 208 flexes upon being pressed outwardly while camming past the enlarged head 112 of the retention post 102 (see FIG. 5). In this embodiment, most of this flexure will occur in the vicinity of hinge plane 207, near where the upper end 214 of the finger 208 and the inner end 211 of the annulus 210 meet.

Each finger 208 has a bead 216 which is close to the lower end 212 of the finger 208. The bead 216 extends radially inwardly from the general inner sidewall surface 218 of the finger 208. The bead 216 has an inclined surface 222 which extends axially downwardly and radially inwardly from the inner sidewall surface 218 of the finger 208 to an innermost margin 226 of the bead 216. A lower inclined surface 224 of bead 216 may extend downwardly and outwardly from the innermost margin 226 of the bead 216 to the lower end 212 of the finger 208. Inclined surfaces 222, 224 may be frustoconical as shown, or alternatively may conform to other surfaces of rotation around axis X, or be planar. The distance between the inner sidewall surface 218 and the innermost margin 226 of the bead 216 may be in the range of 1 mm to 1.75 mm, as measured along a radius which is at right angles to axis X. In the illustrated embodiment, the innermost margin 226 of the bead 216 extends radially inwardly approximately 1.25 mm from the inner sidewall surface 218. The lower and upper inclined surfaces 224, 222 are at angles relative to the axis X. The angle of upper inclined surface 222 may be in the range of 30 to 60 degrees. In some embodiments the angle of inclined surface 222 may be forty-five degrees. The angle of the terminating inclined surface 224 may be in the range of 120 to 160 degrees, and may be chosen to be 150 degrees.

The bead 216 is adapted to engage a vehicle floor cover retention post or stud 102 (See FIGS. 1 and 5-5C). The bead 216 is shaped such that it can engage vehicle floor cover retention studs 102 of varied sizes and shapes, as will be discussed in conjunction with FIGS. 5-5C. In alternative embodiments the bead 216 may have a shape other than the one illustrated.

Figure 3:
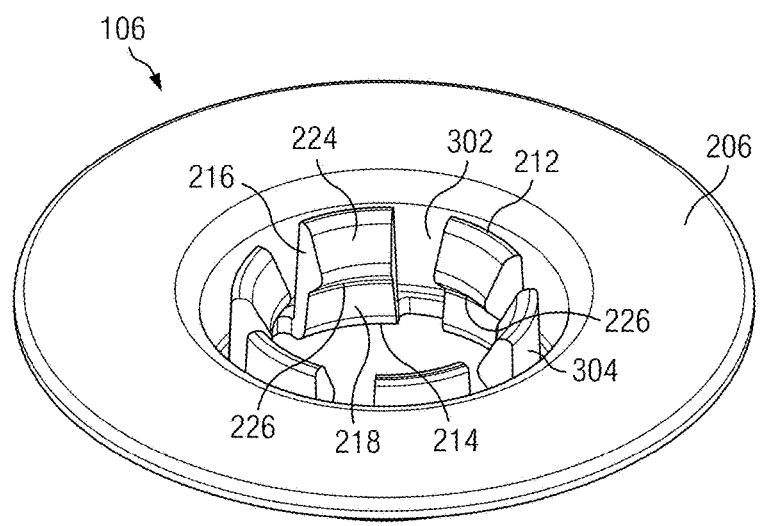
FIG. 3 is a bottom isometric view of the bottom grommet shown in FIG. 2.

As seen in FIG. 3, the outer sidewall surface 304 of each finger 208 is opposed to the inner sidewall surface 218 of the finger 208. Surface 304 is spaced from surface 302. The inner surface 302 of the outer sidewall 202 extends from the floor cover retention flange 206 to the annulus 210.

FIG. 4 is a section, taken substantially along a plane that includes axis X, of the bottom grommet 106 as attached to the top grommet or cap 108. The top grommet 108 has a downwardly extending sidewall 402 from which an annular rib or latch 404 extends radially inwardly. The annular rib 404 of the top grommet 108 snaps over the engagement ridge 220 of the bottom grommet 106. In this manner, the top grommet 108 is secured to the bottom grommet 106. Alternative embodiments may have other features to aid in fastening the top grommet 108 to the bottom grommet 106, such as snaps of shapes different from those shown, push-and-twist arrangements, or screw threads.

Each finger 208 must have room to flex. Therefore, the radial distance ("radial" being used herein as meaning a direction at right angles to axis X) between the innermost margin 226 of the bead 216 and the general inner sidewall surface 218 of finger 208 should be less than or equal to the radial spacing between inner surface 302 of the outer sidewall 202 and the outer sidewall surface 304 of finger 208. This spacing then will be large enough to allow the complete outer radial displacement of the bead 216 as it cams past the retention post head 112. The radial thickness of the bead 216 from innermost margin 226 to the general inner sidewall surface 218 of finger 208 can be selected from the range of 1 to 3 mm. In some embodiments, the thickness of the bead 216 may be 1.25 mm.

In the illustrated embodiment, each finger 208 has two sections: a first, radial section 406, located within hinge plane 207, and a second, downwardly extending, axial section 408. The first section 406 extends radially inwardly within hinge plane 207 until its junction with second section 408. The second section 408 downwardly depends from the inner end of first section 406. Alternatively, fingers 208 could be so formed that they depend directly downwardly from annulus 210 without any intervening radial finger section.

FIGS. 5-5C illustrate the bottom grommet 106 and top grommet 108 used in affixing a vehicle floor cover 104 to each of several differently shaped vehicle retention studs 102. As seen in FIG. 5, the retention stud 102 has an enlarged head 112 which is the uppermost part of the stud 102. The head 112 has a retention stud head wall 502 and, in the embodiment shown in FIG. 5, has a sloped transition wall 504. The head sits on top of a stem 506 which is narrower in diameter than the retention stud head wall 502.

The fingers 208 of the bottom grommet 106 engage the retention stud 102. As described above, the bead 216 of the finger 208 has an upper inclined surface 222 and a lower inclined surface 224. In the illustrated embodiment, the upper inclined surface 222 of the bead 216 is smaller than the lower inclined surface 224 of the bead 216. Alternative embodiments may have fingers 208 with beads 216 that have different shapes and upper inclined surfaces 222 and lower inclined surfaces 224 that have different lengths or angles than the bead 216 illustrated in FIGS. 5-5C. Upper inclined surfaces 222 are nonetheless large enough to offer expanded loci of contact with the surfaces of different post heads 112. The inclined surfaces 222 thus provide more adaptability of the grommet to different retention posts 102.

As shown in FIG. 5, the upper inclined surface 222 engages the transition wall 504 of the retention stud 102. In this illustrated embodiment the slope of the upper inclined surface 222 and the slope of the transition wall 504 approximately match. In alternative embodiments the slopes may be different or may exactly match. The attachment of the bottom grommet 106 to the retention stud 102 is ensured when the innermost margin 226 of the bead 216 extends inwardly such that the inner diameter of the bottom grommet 106 at that point is greater than the stem 506 diameter but less than the diameter of the retention stud head wall 502.

The slope of the lower inclined surface 224 is determined such that the bottom grommet 106 can cam over the retention post head 112, and so that a user can more easily index the bottom grommet to the post head 112. The fingers 208 flex substantially within hinge plane 207 when sliding over the retention post head 112, after which the fingers 208 elastically return to their original position or, depending on the size of the engaged retention post stem 506, remain in a semi-flexed position.

Also as seen in each of FIGS. 5-5C, the cap 108 has a downwardly depending sidewall 508 with an outer sidewall surface 510. This outer sidewall surface 510 fits within floor cover hole 110 and is the portion of the grommet 105 that bounds the hole 110.

FIG. 5 shows a retention post or stud 102 with a first profile. A top 520 of the retention post is near a bottom surface 522 of the cap 108. The retention post head wall 502 is close to the general inner sidewall surface 218 of the fingers 208. The angle of the transition wall 504 approximately matches that of inclined surface 222, and is about twice as long. The diameter of stem 506 is considerably less than the inner diameter of bottom grommet 106 as measured across the innermost bead margins 226.

Figure 5A:
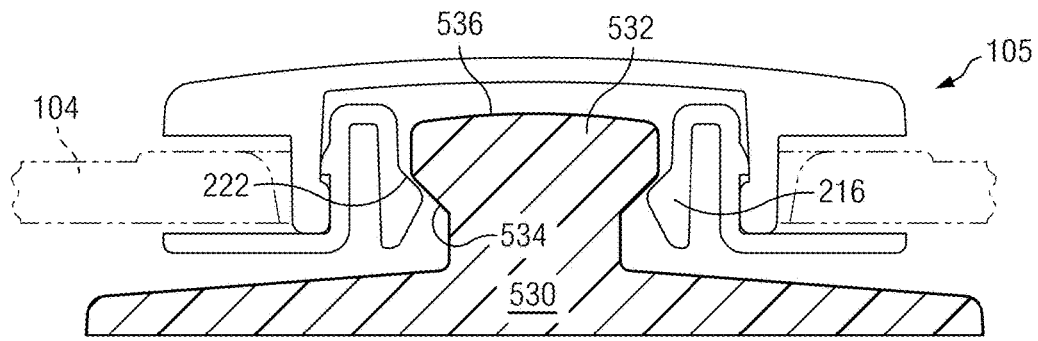
FIG. 5A is a simplified sectional view similar to that shown in FIG. 5, of the embodiment shown in FIGS. 1-4, shown as fastening a vehicle floor cover to a second vehicle floor cover retention post.

FIG. 5A shows grommet 105 as affixing a vehicle floor cover 104 to a retention post 530 that has a profile that is different from retention post 102. The diameter of the enlarged head 532 of the post 530 is smaller than that of post 102. The inclined surface 222 of the bead 216 is nonetheless long enough to engage post inclined wall 534 in an interference fit. A top wall 536 of the post 530 is also not as high as the top wall 520 of retention post 102.

Figure 5B:
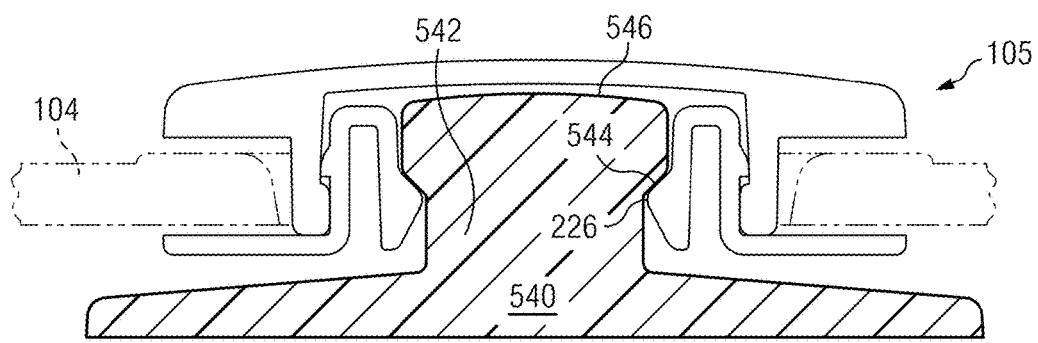
FIG. 5B is a simplified sectional view similar to that shown in FIG. 5A, of the embodiment shown in FIGS. 1-4, shown as fastening a vehicle floor cover to a third vehicle floor cover retention post.
Figure 5C:
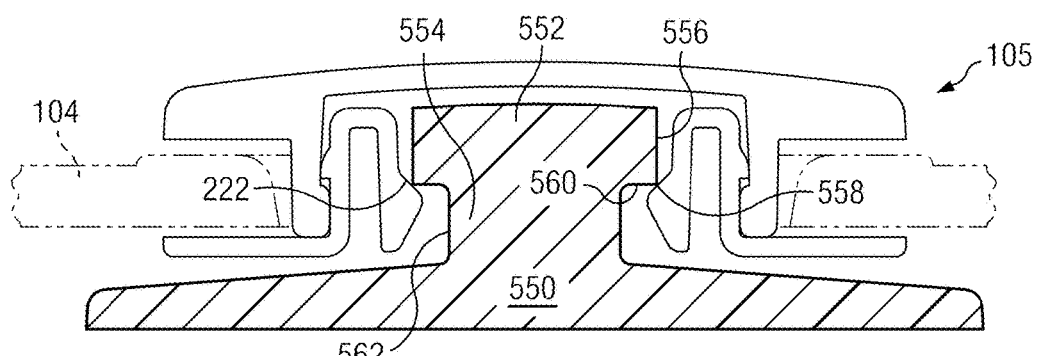
FIG. 5C is a simplified sectional view similar to that shown in FIGS. 5A and 5B, of the embodiment shown in FIGS. 1-4, shown as fastening a vehicle floor cover to a fourth vehicle floor cover retention post.

In FIG. 5B, a retention post 540 is seen that has a significantly thicker stem 542. The diameter of stem 542 is about the same as the bottom grommet minimum inner diameter measured across innermost bead margins 226. Grommet 105 can even accommodate posts with stems that are thicker than this, so long as there is a significant difference in the diameter of the post head and that of the post stem. The position of sloped sidewall 544 and top wall 546 are similar to those for retention post 102.

The retention post 550 seen in FIG. 5C has no inclined transition wall between its head 552 and its stem 554. Instead, the vertical wall 556 of the head 552 terminates at an abrupt corner 558. A horizontal surface 560 extends from this corner 558 to a sidewall 562 of the post stem 554. The inclined surface 222 engages with corner 558 to retain the floor cover 104 on the post 550. The inclined surface 222 is extensive enough that it can snap past lower post head corners at various positions, and still retain the grommeted floor cover on the post.

Figure 6:
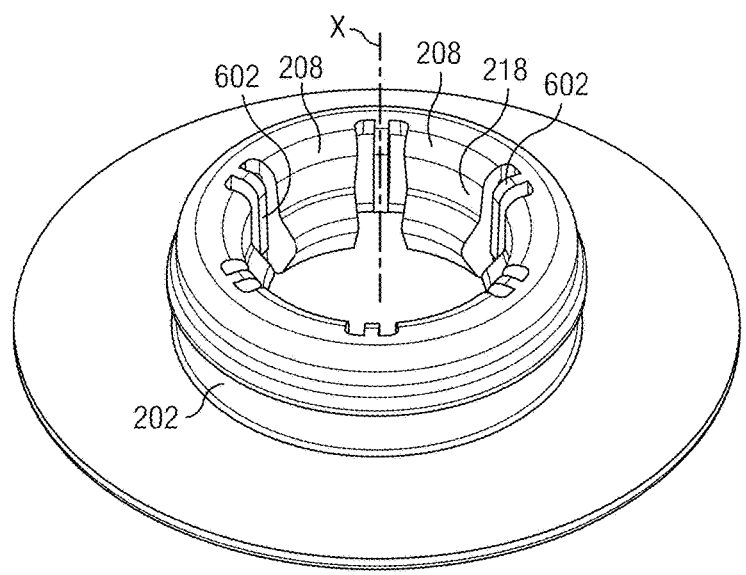
FIG. 6 is top isometric view of a second embodiment of the bottom grommet.
Figure 7:
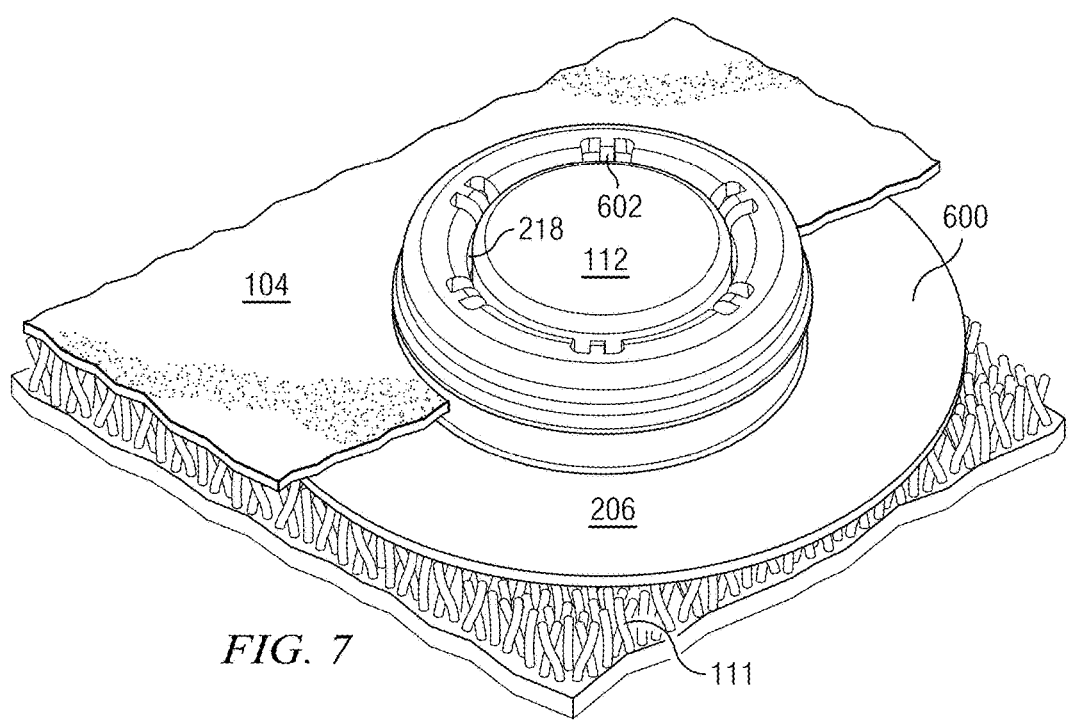
FIG. 7 is a top isometric view of the second embodiment of the bottom grommet snapped over a vehicle floor cover retention post.

FIG. 6 illustrates a second embodiment 600 of the bottom grommet. In this embodiment, relatively small (in terms of their angular width relative to axis X) guide ribs 602 are interleaved between the fingers 208. In this embodiment there is one small guide rib 602 between each pair of adjacent fingers 208 but alternative embodiments may have guide ribs 602 in fewer spaces and the guide ribs 602 may have widths and heights different from those shown. Specifically alternative embodiments may have three guide ribs 602 interleaved between a subset of the fingers 208. The guide ribs 602 are elongate and aligned with axis X, and are attached along their outer axial ends to the inner surface 302 of the outer sidewall 202. The general inner sidewall surfaces 218 of the fingers 208 each conform to an imaginary cylinder, which is slightly larger than the diameter of the largest post head 112 that the bottom grommet 106 is designed to receive, as shown in FIG. 7. The guide or support ribs 602 extend radially inwardly to stop at this same imaginary cylinder. The guide ribs 602 are not designed to flex, and they therefore are more resistant to the lateral displacement of the floor cover 104 (and of the bottom grommet 106 installed therein) relative to the retention post head 112.

Figure 8:
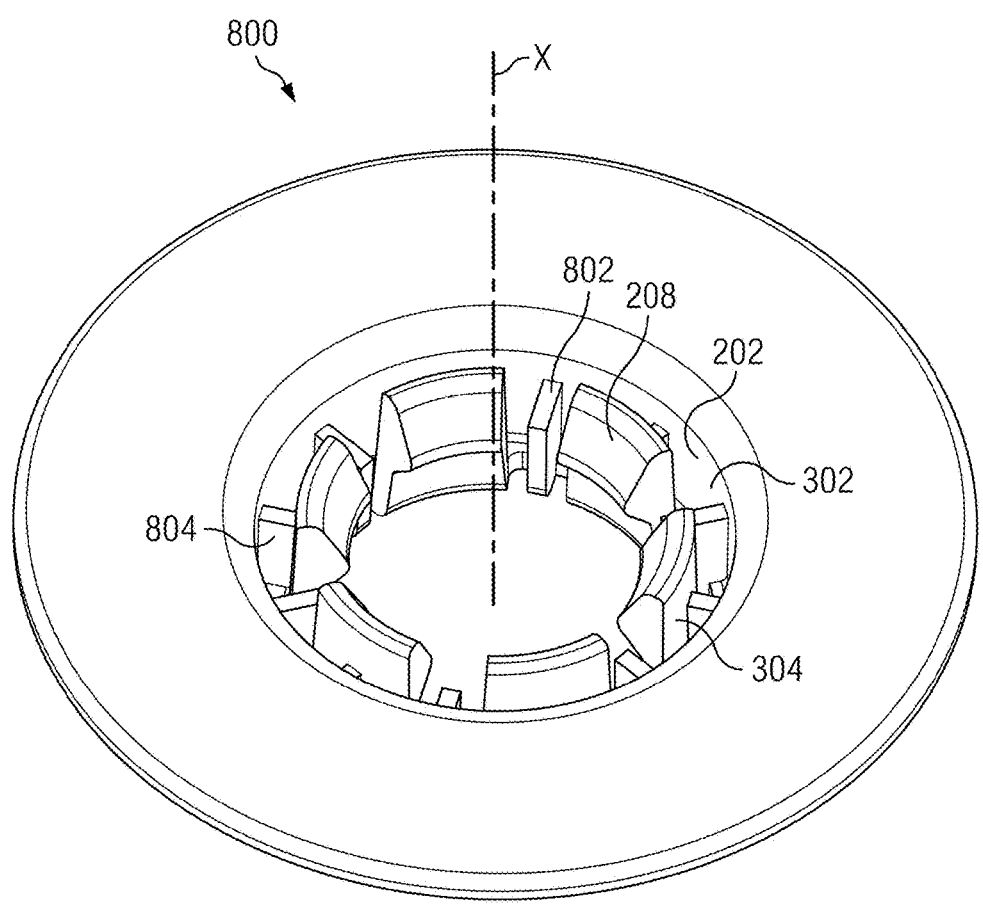
FIG. 8 is a bottom isometric view of a third embodiment of the bottom grommet.

A third embodiment 800 of a bottom grommet is illustrated in FIG. 8. As shown, the bottom grommet 800 has small guide ribs 802 and small cross ribs 804. Each cross rib 804 extends from the inner surface 302 of the outer sidewall 202 to the outer sidewall surface 304 of the respective finger 208. An angular width of each cross rib 304 (relative to axis X) is much smaller than the angular width of the finger 208 that it supports. For example, the angular width of the cross rib 304 can be one-fourth or less of the angular width of the finger 208. Each cross rib downwardly depends from annulus 210 (not shown; see FIG. 4) for a predetermined distance that may be less than the axial length of the finger 208 that it supports. The cross ribs 804 are behind each finger 208 to increase flex strength and help provide lateral support against the head of the vehicle floor cover retention stud 102. In this embodiment there is one small guide rib 802 in between each finger and one cross rib 804 behind each finger 208 but alternative embodiments may have guide ribs 802 and cross ribs 804 in fewer spaces and the guide ribs 802 and cross ribs 804 may have varied widths and heights or ones different from those shown.

In the embodiment shown in FIG. 8, the fingers 208 will flex around a post head 112 in a way that is different than the flexure of the embodiments described above. As the fingers 208 cam over the post head 112, they will have more of a tendency to radially outwardly displace or stretch as a unit and will hingedly flex less. Such hinged flexure as does occur will more be more be likely to occur along that length of the finger 208 that is not supported or braced by a cross rib 804. Otherwise, the fingers 208 will expand as a combined hoop and thus the hoop strength of the outer sidewall 202 comes more into play. Each cross rib 804 can also be made thin enough that it will bow or tangentially displace under radial force imparted by the post head, allowing more of a hinged flexure of the finger 208 that it supports.

Figure 9:
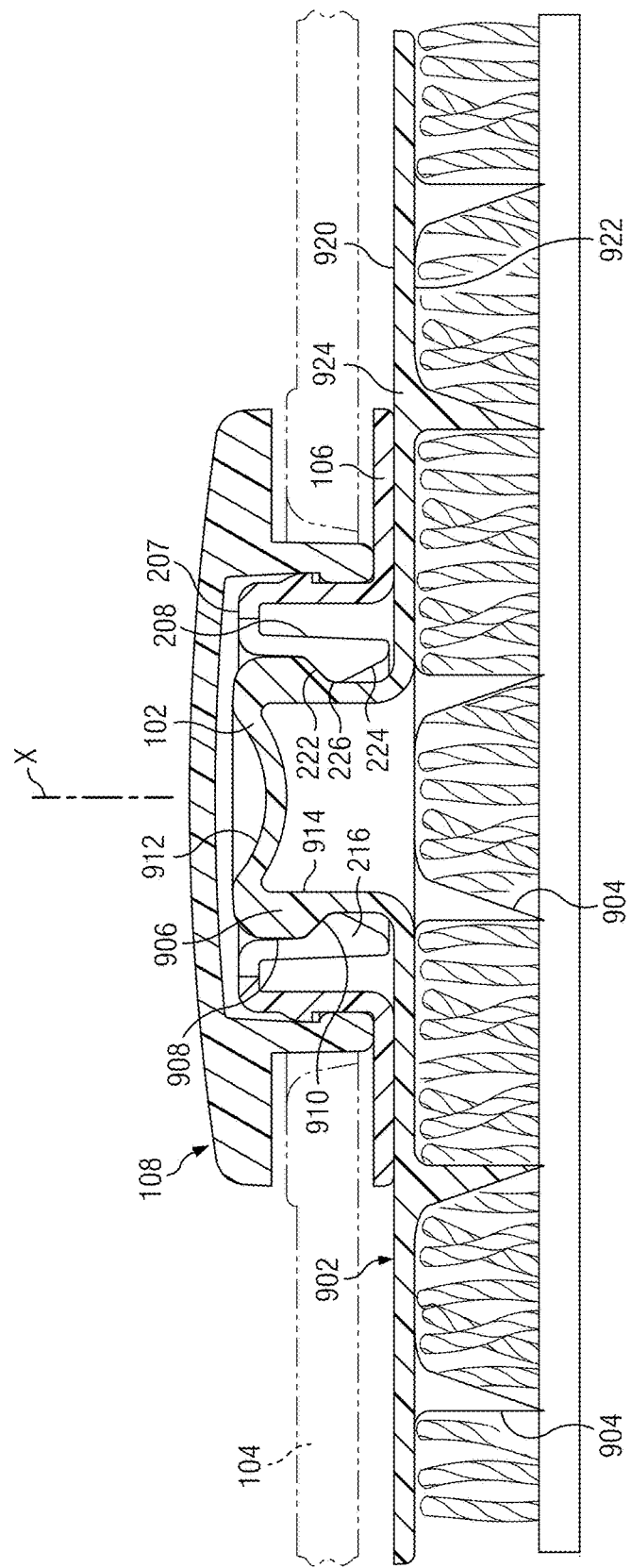
FIG. 9 is a vertical sectional view, taken through axis X, of a further embodiment of the invention shown as assembled to a floor cover and engaging a carpet.

In the embodiment shown in FIG. 9, a bottom grommet 106 and top grommet 108 are assembled to clad a hole in a floor cover 104, and snapped over the post or stud 102 of a vehicle carpet affixation device 902. The affixation device 902 has a body 924 that may be formed of nylon or another suitable polymer compound. The device 902 has a first, lower face 922 and a second, upper face 920, both planar and substantially at right angles to axis X. The body 924 is thin, relative to the entire height of the affixation device 902, and flat, and may have a circular, square, rectangular, or hexagonal marginal shape or any other shape which produces commercially acceptable results. In the illustrated embodiment the lateral margin of the device body 924 is spaced from axis X by a radius which is many times that of the radius of head wall 908 or stem 914.

Many projections 904 downwardly extend from the first face 922 in parallel with the axis X. In this embodiment, the projections 904 are arranged in linear rows and have a triangular base and are pyramidal in shape. The projections 904 in the illustrated embodiment are spikes. Other embodiments may have projections that are different shapes and/or have bases of different shapes, such that the projections are substantially circular cones or rectangular pyramids. The projections 904 bite into the pile of the carpeting of the foot well floor which prevents the device 902, and the grommets 106, 108 and floor cover 104 attached to it, from moving.

As seen in FIG. 9, the affixation device 902 has a horizontally enlarged head 906. In this embodiment the enlarged head 906 has an upwardly concave top 912, chosen for moldability. Other embodiments may have flat tops or hollow tops. The head 906 has a head wall 908 that is circularly cylindrical and centered on axis X. The head 906 sits on top of a cylindrical stem 914 which is narrower in diameter than the head wall 908. In this embodiment, a sloped frustoconical transition surface or wall 910 proceeds upwardly and outwardly from an upper end of the outer surface of stem 914 to a lower end of the head wall 908.

The fingers 208 of the bottom grommet 106 engage the retention stud 102. As described above, the bead 216 of each finger 208 has an upper inclined surface 222 and a lower inclined surface 224. In the illustrated embodiment, the upper inclined surface 222 of the bead 216 is smaller than the lower inclined surface 224 of the bead 216. Lower inclined surface 224 may be oriented at about 150 degrees from axis X. Upper inclined surface 222 may be oriented at about 45 degrees from axis X. Alternative embodiments may have fingers 208 with beads 216 that have different shapes and upper inclined surfaces 222 and lower inclined surfaces 224 that have different lengths or angles. As illustrated in FIG. 9, the upper inclined surface 222 engages with the affixation device head 906.

As shown in FIG. 9, the upper inclined surface 222 engages the transition wall 910 of the affixation device 902. In this illustrated embodiment the slope of the upper inclined surface 222 and the slope of the transition wall 910 at least approximately match. In alternative embodiments the slopes may be different. The attachment of the bottom grommet 106 to the retention stud 102 is ensured when the innermost margin 226 of the bead 216 extends inwardly such that the inner diameter of the bottom grommet 106 at that point is greater than the stem 914 diameter but less than the diameter of the retention stud head wall 908.

The slope of the lower inclined surface 224 is determined such that the bottom grommet 106 can cam over the retention post head 906, and so that a user can more easily index the bottom grommet to the post head 906. The fingers 208 flex substantially at horizontal hinge plane 207 when sliding over the retention post head 112, after which the fingers 208 elastically return to their original position or, depending on the size of the engaged retention post stem 914, remain in a semi-flexed position.

Figure 10:
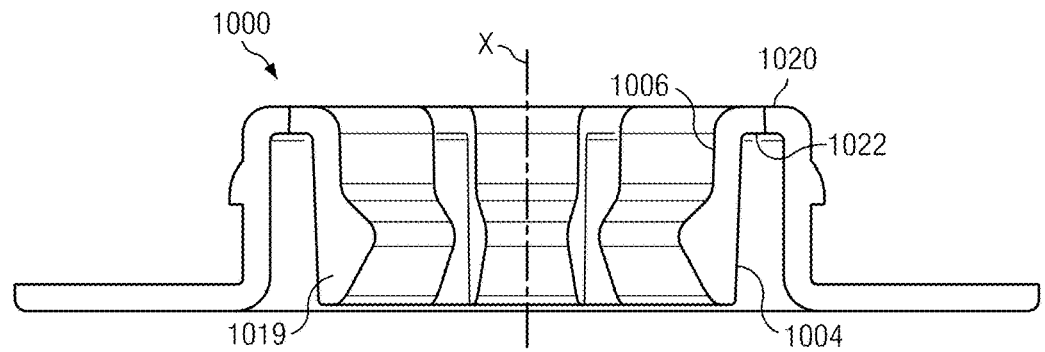
FIG. 10 is a vertical sectional view, taken through axis X, of a fourth embodiment of the bottom grommet.

A fourth embodiment 1000 of a bottom grommet is illustrated in FIG. 10. In the embodiment shown in FIG. 10, the fingers 1019 are thicker than in the embodiments illustrated in FIGS. 1-9; the fingers have a greater distance between the inner sidewall surface 1006 and the outer sidewall surface 1004. In addition, each finger is thicker between the top or hinge plane 1020 and the uppermost inner surface 1022. The additional material added to the fingers 1019 will increase the thickness and strength of the fingers 1019, will decrease their displacement under any force acting radially, and will increase their stiffness or spring constant. While the embodiment in FIG. 10 shows the fingers 1019 without being interleaved with centering ribs, interleaving centering ribs could also be provided in a manner similar to that shown for FIG. 11 below.

Figure 11:
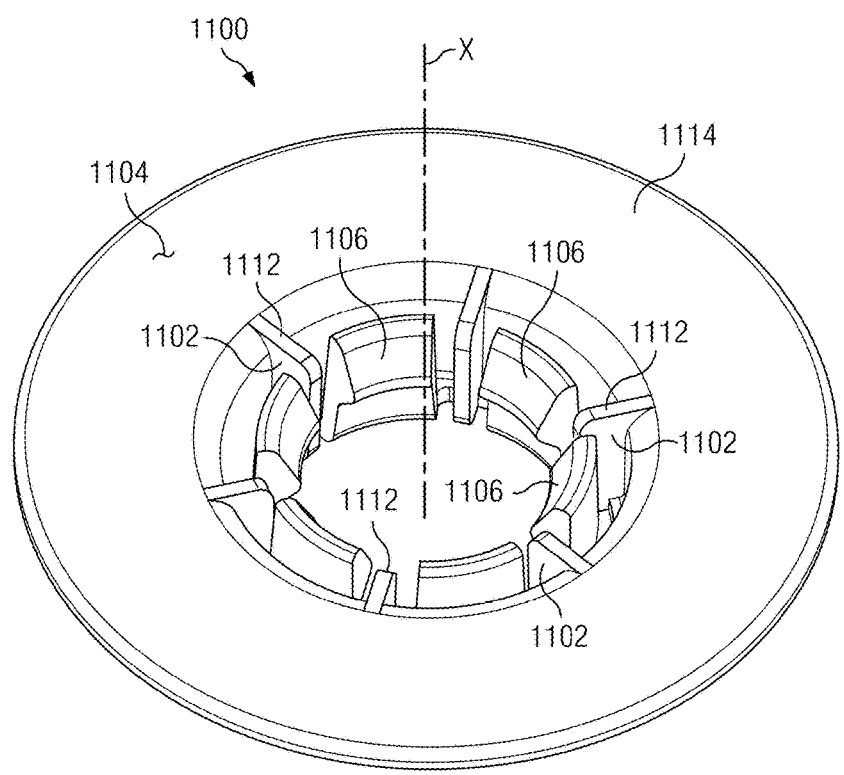
FIG. 11 is a bottom isometric view of a fourth embodiment of the bottom grommet.

In FIG. 11 the bottom grommet 1100 has six centering ribs 1102. Other embodiments may have a different number of centering ribs 1102. The centering ribs 1102 are positioned between adjacent ones of the fingers 1106. In the illustrated embodiment there is a single centering rib 1102 in between each adjacent pair of fingers 1106. Other embodiments may have a different number of centering ribs 1102. The positioning of the centering ribs 1102 protects the fingers 1106 from breakage when attaching the bottom grommet 1100 to a vehicle floor cover retention post or stud 102 (see FIG. 1). The post (112 on FIG. 1) can slide along the centering ribs 1102 during consumer installation. A bottom edge 1112 of each centering rib 1102 can terminate in the horizontal plane occupied by a lower surface 1104 of the bottom grommet flange 1114.

In the embodiment shown in FIG. 12, a bottom grommet 106 and top grommet 108 are assembled to clad a hole in a floor cover 104, and snapped over the head or stud 102 of a vehicle carpet affixation device 1201. The affixation device 1201 has a body 1206 that may be formed of nylon or another suitable polymer compound. The device 1201 has a first, lower face 1218 and a second, upper face 1220, both planar and substantially at right angles to axis X. The body 1206 is thin, relative to the entire height of the affixation device 1201, and flat, and may have a circular, square, rectangular, or hexagonal marginal shape or any other shape which produces commercially acceptable results. In the illustrated embodiment the lateral margin of the device body 1206 is spaced from axis X by a radius which is many times that of the radius of head wall 1208 or stem 1214.

The affixation device 1201 illustrated in FIG. 12 is used on non-carpeted vehicle foot wells 1204 such as ones finished in vinyl or painted metal. The affixation device 1201 (see FIG. 13) has an adhesive layer 1202 that is attached to the lower face 1218 of the affixation device body 1206. In the illustrated embodiment the adhesive layer 1202 has a smaller diameter than the affixation device body 1206 but other embodiments may have an adhesive layer 1202 that has an identical diameter as the affixation device body 1206 or a different shape or diameter than illustrated. Adhesive layer 1202 may be constituted by a foam core having opposed adhesive surfaces, and a bottom surface of the adhesive layer 1202 may be protected by a peel-off release layer (not shown) prior to its adhesion by a consumer or user to a top smooth surface of vehicle foot well 1204.

As seen in FIG. 12, the affixation device 1201 has a horizontally enlarged head 1216. In this embodiment the enlarged head 1216 has an upwardly concave top 1212, chosen for moldability. Other embodiments may have flat tops or hollow tops. The head 1216 has a head wall 1208 that is circularly cylindrical and centered on axis X. The head 1216 sits on top of a cylindrical stem 1214 which is narrower in outer diameter than the head wall 1208. In this embodiment, a sloped frustoconical transition surface or wall 1210 proceeds upwardly and outwardly from an upper end of the outer surface of stem 1214 to a lower end of the head wall 1208.

The fingers 208 of the bottom grommet 106 engage the retention stud or post 1222. As described above, the bead 216 of each finger 208 has an upper inclined surface 222 and a lower inclined surface 224. In the illustrated embodiment, the upper inclined surface 222 of the bead 216 is smaller than the lower inclined surface 224 of the bead 216. Lower inclined surface 224 may be oriented at about 150 degrees from axis X. Upper inclined surface 222 may be oriented at about 45 degrees from axis X. Alternative embodiments may have fingers 208 with beads 216 that have different shapes and upper inclined surfaces 222 and lower inclined surfaces 224 that have different lengths or angles. As illustrated in FIG. 12, the upper inclined surface 222 engages with the affixation device head 1216.

As shown in FIG. 12, the upper inclined surface 222 engages the transition wall 1210 of the affixation device post 1222. In this illustrated embodiment the slope of the upper inclined surface 222 and the slope of the transition wall 1210 at least approximately match. In alternative embodiments the slopes may be different. The attachment of the bottom grommet 106 to the retention stud 1222 is ensured when the innermost margin 226 of the bead 216 extends inwardly such that the inner diameter of the bottom grommet 106 at that point is greater than the stem 1214 diameter but less than the diameter of the retention stud head wall 1208.

The slope of the lower inclined surface 224 is determined such that the bottom grommet 106 can cam over the retention post head 1216, and so that a user can more easily index the bottom grommet to the post head 1216. The fingers 208 flex substantially at horizontal hinge plane 207 when sliding over the retention post head 112, after which the fingers 208 elastically return to their original position or, depending on the size of the engaged retention post stem 1214, remain in a semi-flexed position. Affixation device 1201 may be used with any combination of bottom and top grommets illustrated or described herein.

FIG. 13 illustrates the adhesive layer 1202 on the lower face 1218 of the affixation body 1206. The adhesive layer 1202 almost completely covers the lower face 1218 in this embodiment. Other embodiments may have adhesive layers 1202 of different dimensions or shapes as long as they produce commercially acceptable results.

Figure 14:
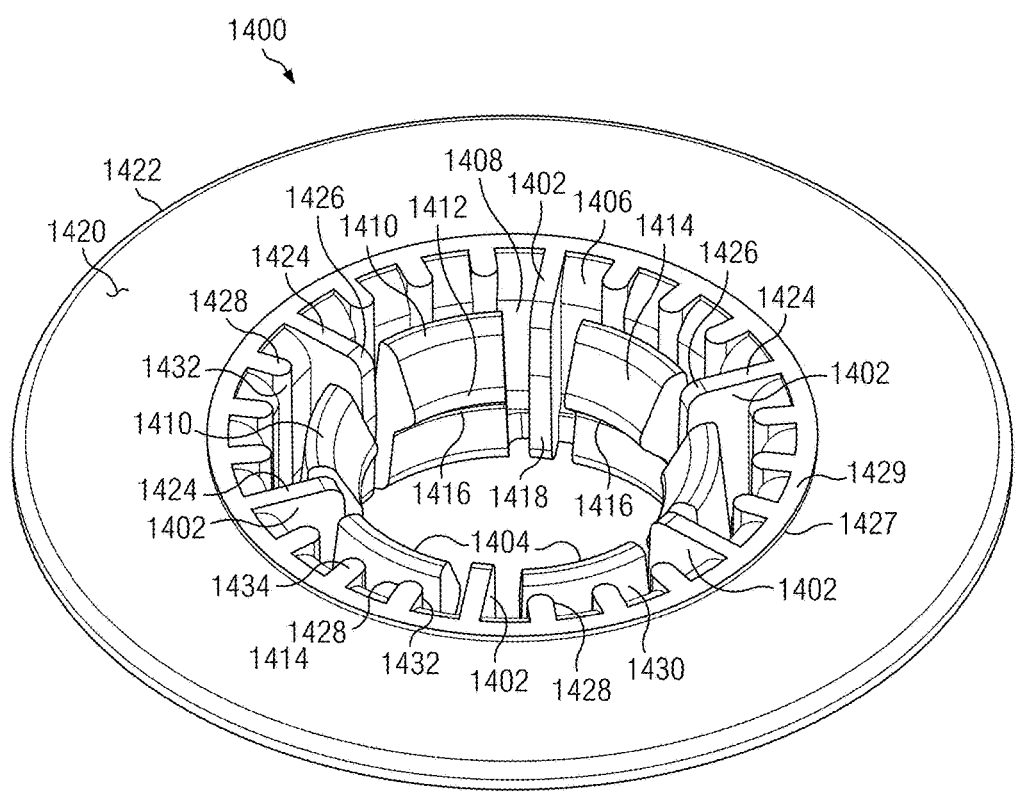
FIG. 14 is a bottom isometric view of a fifth embodiment of a bottom grommet for use with the invention.
Figure 15:
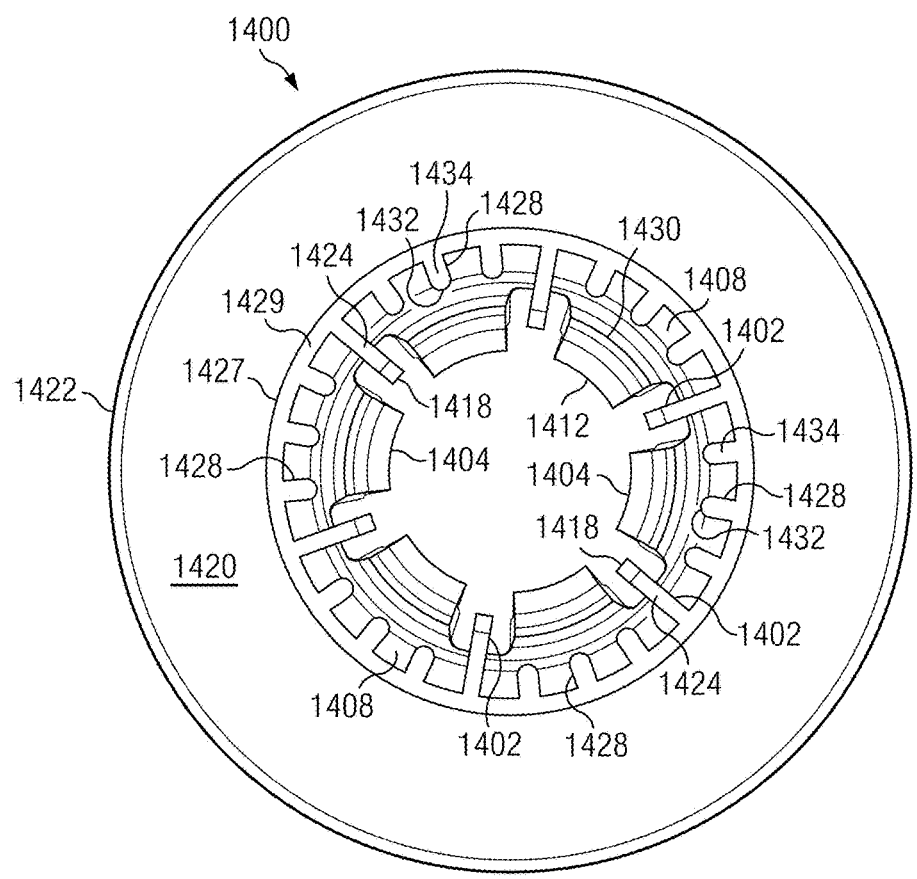
FIG. 15 is a bottom view of the bottom grommet shown in FIG. 14.

A bottom grommet 1400 is shown in FIGS. 14 and 15 that may be used with any of the top grommets and affixation devices above described. The darker color of certain components of the grommet 1400 show modifications from the bottom grommet 106 as shown in FIG. 3; the grommet 1400 preferably is molded as a single piece. Similar to the embodiment shown in FIG. 11, a centering rib 1402 is disposed in between each pair of fingers 1404. Each centering rib 1402 is vertically aligned with the axis of the grommet 1400. A thickness of each centering rib 1402 is less than the radial spacing between adjacent fingers 1404. Each centering rib 1402 is integrally molded with the outer sidewall 1406 of the bottom grommet 1400, so as to radially inwardly extend from the inner cylindrical surface 1408 of the grommet sidewall 1406.

Fingers 1404 are similar to fingers 1106 as seen in FIG. 11. Each finger 1404 terminates in a bead 1410 that has a radial inner margin 1412. Each bead 1410 has a pair of inclined surfaces 1414 and 1416 that are similar to inclined surfaces 1008, 1012 described in conjunction with FIG. 10. Each centering rib 1402 has an inner vertical surface or margin 1418 that is disposed on an imaginary cylindrical surface spaced radially inwardly from surface 1408 of grommet sidewall 1406, but disposed radially outwardly from the position of the bead inner vertical surfaces 1412 that they occupy in an unflexed condition. Axially, each centering rib 1402 can extend from the plane occupied by lower surface 1420 of bottom grommet flange 1422, to the top end of the grommet sidewall 1406. A lower surface 1424 of each centering rib 1402 may be joined to the inner vertical surface 1418 thereof through a curved transition 1426. Instead of terminating at the plane occupied by lower surface 1420, each surface 1424 may instead terminate at the lower surface 1427 of a ring 1429, where surface 1427 occupies a plane below bottom surface 1420.

Each finger 1404 has associated therewith one or more guard ribs 1428 that are disposed radially outwardly from an outer cylindrical sidewall 1430 of the finger 1404. Each guard rib 1428 projects radially inwardly from the inner surface 1408 of the grommet sidewall 1406. An inner surface or margin 1432 of each guard rib 1428 is spaced from the outer cylindrical sidewall 1430 of the finger 1404 with which it is associated. A bottom margin or surface 1434 of each guard rib 1428 can be coplanar with flange lower surface 1420 or, as shown, can be coplanar with lower surface 1427 of ring 1429. Each guard rib extends axially upwardly from surface 1434 until its termination at and fusion with a lower surface of a hinge element of the finger 1404 (similar to surface 1022 as seen in FIG. 10).

In the illustrated embodiment, guard ribs 1428 are about as thick as centering ribs 1402. In the illustrated embodiment, three guard ribs 1428 are provided for each finger 1404 and are arranged around the axis so as to be equally spaced from each other and from adjacent centering ribs 1402. The number, placement and spacing of the guard ribs 1428 may be varied as other design constraints dictate. The thickness or angular extent of each guard rib 1428 is less than the spacing between it and a neighboring guard rib 1428 or centering rib 1402.

Figure 16:
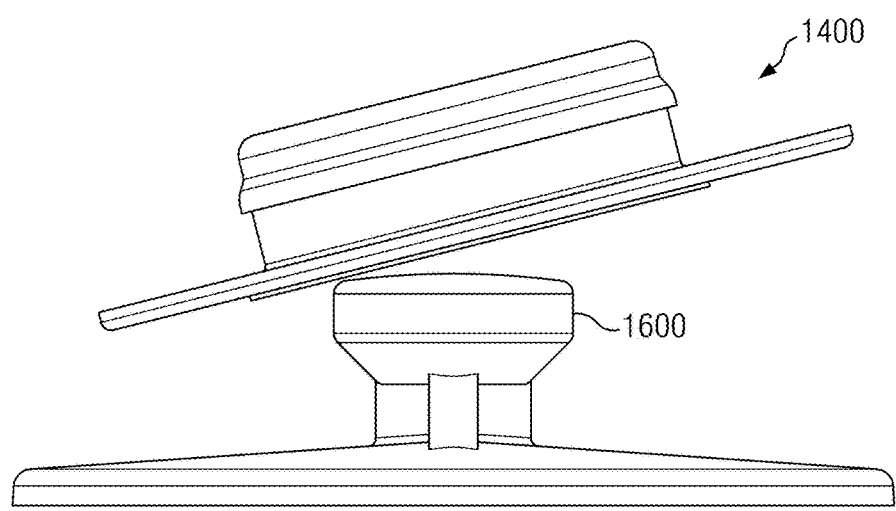
FIG. 16 is a side view of the bottom grommet shown in FIGS. 14 and 15, shown in a possible position that it could take while fitting the grommet and an attached floor cover to a vehicle foot well post.

FIG. 16 shows a grommet 1400 in a canted position relative to a vehicle mat retention post 1600. Grommet 1400 can take this position as affixed to a mat or floor tray (not shown), and as it is being lowered onto the post 1600. In this position and without the provision of guard ribs 1428, one or more of the fingers 1404 may catch onto the head 1602 of the post 1600, causing them to flex inwardly toward the axis and inadvertently to be bent over or even break off during mat installation. Each group of guard ribs 1428 prevents or least limits the post head 1602 from contacting radial outward surfaces of the associated finger 1404.

In summary, embodiments of a vehicle floor cover grommet have been shown and described which can accommodate each of a variety of different vehicle foot well retention posts.

While illustrated embodiments of the present invention have been described and illustrated in the appended drawings, the present invention is not limited thereto but only by the scope and spirit of the appended claims.

We claim:

1. A system for attaching a floor cover to a vehicle foot well, the system comprising:

a bottom grommet, an outer sidewall of the bottom grommet formed around an axis and having an outer surface and an inner surface, a floor cover retention flange of the bottom grommet joined to the outer sidewall and radially outwardly extending from the outer surface of the outer sidewall, the outer sidewall of the bottom grommet extending axially upwardly from the retention flange to a hinge plane of the bottom grommet;

an annulus disposed in the hinge plane of the bottom grommet and radially inwardly extending from the outer sidewall of the bottom grommet to an inner end of the annulus;

a plurality of fingers disposed around the axis to be angularly spaced apart from each other, an upper end of each finger joined to the inner end of the annulus so that the annulus spaces said upper end from the inner surface of the outer sidewall, each finger extending axially downwardly from the upper end of the finger to a lower end of the finger and having an inner sidewall surface disposed between the upper and lower finger ends that is in alignment with the axis;

for each finger, a bead formed proximate to the lower end of the finger and radially inwardly extending from the inner sidewall surface of the finger, the bead adapted to engage any of a plurality of differently shaped, predetermined vehicle foot well retention post heads with an interference fit;

each finger having an outer surface facing the inner surface of the outer sidewall of the bottom grommet, the bottom grommet further including, for each finger, a vertical rib radially extending from the inner surface of the outer sidewall to the outer surface of the finger, an angular width, relative to the axis, of the vertical rib being less than or equal to one-fourth of a corresponding angular width of the finger;

a top grommet, a downwardly extending sidewall of the top grommet adapted to fasten to the outer surface of the outer sidewall of the bottom grommet; and an affixation device adapted for attachment to a vehicle foot well, the affixation device having an affixation device body with an upper surface and a lower surface, a floor cover retention post upwardly extending from the upper surface of the affixation device body and adapted to engage the fingers of the bottom grommet.

2. The system of claim 1, wherein the affixation device is adapted to be affixed to carpeting, a plurality of projections extend from the lower surface of the affixation device body, each projection spaced from adjacent projections, the projections forming a two-dimensional array.

3. The system of claim 1, wherein the affixation device is adapted to be affixed to an uncarpeted surface of the vehicle foot well, an adhesive layer attached to and extending downwardly from the lower surface of the affixation device body.

4. A system for attaching a floor cover to a vehicle foot well, the system comprising:
   a bottom grommet, an outer sidewall of the bottom grommet formed around an axis and having an inner surface and an outer surface, a floor cover retention flange of the bottom grommet joined to the outer sidewall and radially outwardly extending from the outer surface of the outer sidewall, the outer sidewall extending axially upwardly from the retention flange to a top plane of the bottom grommet;
   a plurality of fingers formed around the axis to be angularly spaced from each other, each finger radially inwardly spaced from the inner surface of the outer sidewall, an inner sidewall surface of each finger disposed on an imaginary cylinder aligned with the axis, the fingers integrally formed with the outer sidewall of the bottom grommet;
   each finger having a lower end axially downwardly spaced from the top plane of the outer sidewall, each finger having a bead, an inner end of the bead disposed radially inwardly from the inner sidewall surface of the last said finger and disposed near the lower end of the finger, each bead having an innermost margin that is disposed closest to the axis, an inclined surface of the bead extending upwardly and outwardly from the innermost margin of the bead to terminate at the inner sidewall surface of the finger;
   each finger having an outer surface facing the inner surface of the outer sidewall of the bottom grommet, the bottom grommet further including, for each finger, a vertical rib radially extending from the inner surface of the outer sidewall to the outer surface of the finger, an angular width, relative to the axis, of the vertical rib being less than or equal to one-fourth of a corresponding angular width of the finger;
   a top grommet, a downwardly extending sidewall of the top grommet adapted to attach to the outer surface of the outer sidewall of the bottom grommet; and
   an affixation device adapted for attachment to a vehicle foot well, the affixation device having an affixation device body with an upper surface and a lower surface, a floor cover retention post upwardly extending from the upper surface of the affixation device body and adapted to engage the fingers of the bottom grommet.

5. The system of claim 4, wherein the affixation device is adapted to be affixed to carpeting, a plurality of projections extend from the lower surface of the affixation device body, each projection spaced from adjacent projections, the projections forming a two-dimensional array.

6. The system of claim 4, wherein the affixation device is adapted to be affixed to an uncarpeted surface of the vehicle foot well, an adhesive layer attached to and extending downwardly from the lower surface of the affixation device body.

7. The system of claim 4, wherein at least one guide rib radially extends from the inner surface of the outer sidewall of the bottom grommet, the guide rib positioned in between adjacent fingers, a thickness of the guide rib being less than the radial spacing between two adjacent fingers, an inner margin of the guide rib being spaced radially outwardly from the innermost margin of the bead.

* * * * *